(12) United States Patent
Farmer (10) Patent No.: US 7,596,561 B2
(45) Date of Patent: Sep. 29, 2009

(54) WEB-BASED MARKETING MANAGEMENT SYSTEM

(75) Inventor: David E. Farmer, Dallas, TX (US)

(73) Assignee: Adgiants, LLC, Dallas, TX (US)

( * ) Notice: Subject to any disclaimer, the term of this patent is extended or adjusted under 35 U.S.C. 154(b) by 0 days.

(21) Appl. No.: 11/046,040

(22) Filed: Jan. 28, 2005

(65) Prior Publication Data

US 2005/0171951 A1 Aug. 4, 2005

Related U.S. Application Data

(60) Provisional application No. 60/540,400, filed on Jan. 30, 2004.

(51) Int. Cl.
*G06F 17/30* (2006.01)
(52) U.S. Cl. .......................... 707/9; 707/102
(58) Field of Classification Search ................. 705/14; 434/323; 709/219; 707/9, 102
See application file for complete search history.

(56) References Cited

U.S. PATENT DOCUMENTS

| | | | |
|---|---|---|---|
| 6,574,655 B1 | 6/2003 | Libert et al. | |
| 6,738,155 B1 | 5/2004 | Rosenlund et al. | |
| 6,748,382 B1 | 6/2004 | Mohan et al. | |
| 6,763,377 B1 | 7/2004 | Belknap et al. | |
| 6,931,591 B1 | 8/2005 | Brown et al. | |
| 2002/0049833 A1* | 4/2002 | Kikinis ..................... | 709/219 |
| 2002/0120506 A1* | 8/2002 | Hagen ....................... | 705/14 |
| 2002/0133402 A1* | 9/2002 | Faber et al. ................. | 705/14 |
| 2002/0177114 A1* | 11/2002 | Klauder ..................... | 434/323 |
| 2004/0153366 A1* | 8/2004 | Olson et al. ................ | 705/14 |
| 2004/0210483 A1* | 10/2004 | Watkins et al. ............. | 705/14 |
| 2005/0076039 A1* | 4/2005 | Ludwig et al. ............. | 707/100 |

OTHER PUBLICATIONS

Saari, Timo et al., "Psychologically Targetted Persuasive Advertising and Product Information in E-Commerce", ICE '04 Sixth International Conference on E-Commerce, p. 245-254 [online], Mar. 2004. Retrieved from the Internet: <URL: http://portal.acm.org/ft_gateway.cfm?id=1052252&type=pdf&col=ACM&dl=ACM&CFID=31488642&CFTOKEN=41629328>.*

(Continued)

*Primary Examiner*—Jean B Fleurantin
*Assistant Examiner*—Dennis Myint
(74) *Attorney, Agent, or Firm*—Fraser Clemens; Martin & Miller LLC; William J. Clemens (57) ABSTRACT

A server runs a software program controlling a system and is connected to the Internet to communicate with one or more advertising agencies. A client of the agencies has a home location with a server connected to the Internet for communication with the server and the agencies. The client can have branches that are connected to the Internet for communication with the server and the Client Home and, in some circumstances, with the agencies. Also connected to the Internet are Media parties representing any and all types of advertising display parties such as radio, television, print, billboard, etc. The media parties also could be brokers that place the advertising with various media outlets.

11 Claims, 5 Drawing Sheets

OTHER PUBLICATIONS

Li, Lei et al., "A Software Framework for Matchmaking Based on Semantic Web Technology", Proceedings of the 12th international conference on World Wide Web p. 331-339 [online], May 200. Retrieved from the Internet: <URL: http://portal.acm.org /ft_gateway.cfm?id=775199&type=pdf&coll=ACM&dl=ACM&CFID=31488642&CFTOKEN=41629328>.*

Burrow, Andrew et al., "Negotiating Access within Wiki: A System to Construct and Maintain a Taxonomy of Access Rules", Proceedings of the fifteenth ACM conference on Hypertext and hypermedia, p. 77-86 [online] Aug. 2004. From Internet: <URL: http://portal.acm.org /ft_gateway.cfm?id=1012831&type =pdf&coll=ACM&dl=ACM&CFID=31488642&CFTOKEN=416293>.*

* cited by examiner

WEB-BASED MARKETING MANAGEMENT SYSTEM

CROSS-REFERENCE TO RELATED APPLICATION

This application claims the benefit of U.S. provisional patent application Ser. No. 60/540,400 filed Jan. 30, 2004.

BACKGROUND OF THE INVENTION

The present invention relates generally to a system for managing marketing programs using a web-based computer program to link advertising agencies, clients and media outlets for the dynamic creation, modification and placement of advertising materials.

Advertising programs typically are created by advertising agencies on behalf of clients that desire to advertise products and/or services locally, nationally, or both. The advertising agencies control the "assets" (the advertising materials to be used) and placement with the media. Thus, changes and customization for different local markets can be costly and time consuming since the client must return to the advertising agency each time.

SUMMARY OF THE INVENTION

The present invention concerns a system for marketing management comprising: a database storing a plurality of advertising assets; an administrator server computer connected to said database, said server computer running a computer program permitting selected user access to said database; and at least one user computer remotely connected to said server computer whereby an authorized user can login at said at least one user computer and view said advertising assets. The server computer includes means for identifying said authorized user as belonging to a category of users permitted to perform at least one of create new advertising assets, store said new advertising assets in said database, modify said stored advertising assets, and place said stored advertising assets. The means for identifying assigns each user to at least one of ad agency, client, client branch, owner/operator and media categories.

The present invention also concerns a method for marketing management comprising the steps of: a. providing a database and storing in the database a plurality of advertising assets; b. providing an administrator server computer and connecting the server to the database; c. running a computer program on the server computer permitting an authorized user at a remote computer access to the database in response to a predetermined login by the authorized user; and d. displaying a one of the advertising assets selected by the authorized user on the remote computer. The method includes assigning the authorized user to one of a plurality of categories of users permitted to perform at least one of create new advertising assets, store the new advertising assets in the database, modify the stored advertising assets, and place the stored advertising assets. The method further includes assigning the authorized user to at least one of ad agency, client, client branch, owner/operator and media categories.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The entire U.S. provisional patent application Ser. No. 60/540,400 filed Jan. 30, 2004 is incorporated herein by reference.

The present invention concerns a revolutionary marketing management and fulfillment system built on a distributed application environment framework. It leverages key benefits of both client and server platforms to maximum advantage; providing an extremely rich yet versatile client interface, coupled to a powerful and robust backend server architecture, and optimized for the bandwidth, stability and security concerns inherent with the Internet. The system includes dynamic online ad creation and ordering through conventional business personal computers and can even be operated from many cell phones or PDA's while using even the slowest speed Internet connection.

Figure 1:
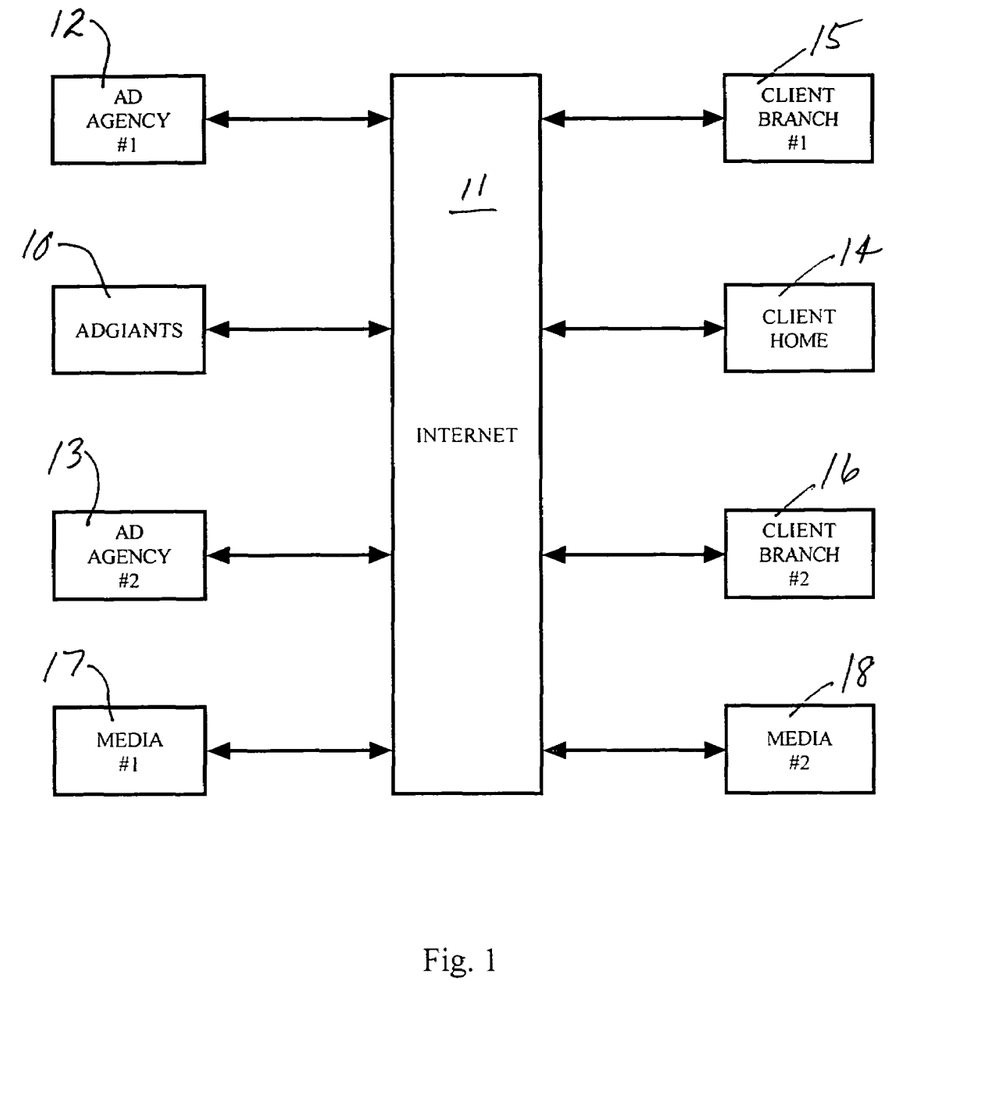
FIG. 1 is a schematic block diagram of communication interconnection between parties using the system in accordance with the present invention.

FIG. 1 (see page 10) is a block diagram of the communication interconnection between the various parties using the system according to the present invention. In the following, "adgiants" refers to the party maintaining the system. An "adgiants" administrator server 10 runs the software program controlling the system and is connected to the Internet 11. The "adgiants" server 10 communicates over the Internet 11 with a first advertising agency Ad Agency #1 12 and a second Ad Agency #2 13. Typically, the agencies 12 and 13 will each have a server permitting numerous employees to communicate with the "adgiants" server 10. For the purposes of this example, only two agencies are shown although the system according to the present invention also will work with one agency and more than two agencies.

A client of the agencies 12 and 13 has a home location 14 with a server connected to the Internet 11 for communication with the "adgiants" server 10 and the agencies 12 and 13. The client 14 can have a Client Branch #1 15 and a Client Branch #2 16 that are connected to the Internet 11 for communication with the "adgiants" server 10 and the Client Home 14, and, in some circumstances, with the agencies 12 and 13. The system according to the present invention will work with more than one client and such clients may have no branches or one or more branches.

Also connected to the Internet are a Media #1 17 and a Media #2 18 representing any and all types of advertising display parties such as radio, television, print, billboard, etc. The media parties also could be brokers that place the advertising with various media outlets. Although two media parties are shown in this example, any number can be connected in the system.

The software program running on the "adgiants" server 10 controls the flow of communication thereby restricting access to information and limiting the authority of the parties. The server 10 includes a computer connected to a database of stored advertising assets such as television and radio spots, newspaper ads, billboard ads, and the like.

The system according to the present invention has a platform that is compatible with numerous OS and hardware platforms, and easily acquired for those not already running it. The platform also provides a rich, flexible and dynamic user interface, and is able to work with a wide range of different media types. This stable platform is mature and proven in its capabilities; it is a highly adopted and well supported platform (should a problem arise, the manufacture and/or developer community must be quick to provide a solution). The preferred platform is Macromedia's Flash Player, now in its sixth iteration, wherein the SWF format (the underlying file type behind Flash technology) is quickly becoming the preferred platform for Web applications. Flash is a key technology for client solutions for the following reasons:

Market Penetration—while the dust is still settling from the long standing "browser wars", Macromedia Flash Player has managed to acquire greater market penetration than any browser; more than 98% of computers connected to the Net have Flash Player 4 or newer installed, while more than 75% currently run the latest Flash Player 6; also, Flash Player comes pre-installed with most new OS's and browsers.

Ease of Installation—the Flash Player is a mere 400K in size and is easily installed as either a browser plug-in or, in the case of Internet Explorer, an ActiveX control; this means that even on a dial-up connection the download and installation only takes a couple of minutes; in addition, Flash movies can be distributed as self-contained files that include the Player within them, eliminating the need for a Web browser as a shell application.

Platform Support—the latest Flash Player is available for all major flavors of Microsoft Windows (including 95, 98, ME, NT, 2000, XP, and CE) and Mac OS in addition to supporting a growing number of cell phones, PDA's, interactive TV, game consoles, and other emerging digital devices.

Rich Media Support—Flash supports both vector and raster images, audio, video, HTML, and XML data in various formats; this makes Flash the richest, most dynamic environment for displaying and combining compelling multimedia; Flash is also able to break out of the constraining page metaphor of HTML—data can be loaded and events can occur without having to reload a page.

Dynamic Data—Flash's support for dynamic data has grown incredibly with its latest release; in addition to dynamically loading JPEG images and MP3 audio, Flash is capable of loading external data in various forms, opening XML sockets, or directly communicating with databases via Flash Remoting.

Open Standard—the SWF format is an open standard which has led to various non-Macromedia solutions for creating and working with SWF files; this also opens the door for building custom extensions to the SWF format to serve our needs into the future.

Streaming Capabilities—the Flash format is inherently optimized for streaming meaning that movies can begin playing while still downloading; additionally, other SWF and FLV (Flash video) files, JPEG's, and MP3's can also be dynamically streamed into a loaded movie.

Communication—with the introduction of Macromedia Flash Communication Server, text, voice, and video conferencing become available both live and stored streaming formats and in peer-to-peer and large audience net casting environments; accompanying applications such as whiteboards also become viable components.

Data Caching—Flash Player allows the user to specify how much local disk space is available to a movie in which to store data; this allows efficient caching of commonly used data on users' systems and also permits work while disconnected from the network.

The "adgiants" server 10 has a backend architecture that provides a solid foundation for developing enterprise level critical applications. A highly stable and scalable platform is required that can power demanding processes sure to grow in number over time. The server software must also support the demanding requirements of the application functionality while smoothly and efficiently communicating with the client platform. At the same time, affordability must be maintained in order make the product a viable and marketable solution.

The server-side architecture is described in the following by platform, database, components, and processing engine(s):

Platform—the Microsoft Windows 2000 Server architecture is favored as the primary server OS, as it balances affordable costs with highly flexible solutions for both hardware and software. Extremely powerful, multi-processor systems can be constructed for relatively little compared to other server platforms since Windows is designed for widely available and affordable PC hardware. Meanwhile, Microsoft Windows is the most widely supported developer platform, for both client and server OS's, which translates into a huge and ever growing number of software solutions available for the platform. In fact many of the server software components that are used by adgiants 2.0 are only available for Microsoft Windows 2000 Server.

Database—Given the choice of the Microsoft OS platform and the need for critical storage of data, Microsoft's SQL Server database is preferred. SQL Server is an efficient and proven database platform that is highly scalable while also supporting flexible means of communicating its data. It also integrates well with the chosen languages used for the middle-tier components.

Components—Various middle-tier components have been developed or implemented that tie the database, processing engine(s), and client platform together. These components are the master coordinators, responding to both client and server events and in turn instantiating new processes. As a result of the demands of the various server technologies that are used, adgiants 2.0 utilizes ASP NET components objects to control the server behavior. Components are used in nearly every facet of the adgiants application, from logon and communication, to asset management and ad ordering.

Processing Engine(s)—With its marketing production focus, it is natural that adgiants would require a means for processing and producing image files for final print output. Who better to turn to than the originators of most of the print and digital publishing technology in use today, Adobe. Adobe has increasingly focused its sites on the growing server market and promises to offer many solutions that adgiants can leverage to provide powerful solutions to its clients. Currently, adgiants is tapping the power of Adobe's Graphic Server 2.0 software for a number of uses, from generating dynamic thumbnails for uploaded images, to decompiling complex page layouts in order to free them for editing and manipulation through the client interface. And, of course, Graphic Server plays a critical role in producing the final print ready files. adgiants has, and continues to work with Adobe to help define the desired capabilities of their growing and evolving server solutions.

Additional tools are included in this system that will further enhance the importance and role adgiants can and will play in the user's environment. Since the adgiants system can be customized for so many broad-reaching companies that have individual structures, these additional tools are a part of the base offering to reach an even higher level of savings and efficiencies.

Alternative Platforms—The adgiants application, founded on the powerful and versatile Flash environment, allows for porting of client-side functionality to any device that is supported by the latest Flash Player (including PDA's, cell phones, interactive TV systems, and a growing number of others, in addition to Microsoft Windows, Mac OS's, and Linux). This means that any implementation of the adgiants application can be accessible to any one with even a small handheld device and an Internet connection.

Unplugged Functionality—Current developments in the Flash application architecture will permit greater caching and subsequent synchronization of data while disconnected from the network. This will permit users on the go to continue to perform many of the critical tasks of the system while on the go or temporarily without network access.

Customizable Windows Interface—It is quite possible to provide a vast array of options for working with the adgiants application and its various tool windows. For instance, one could break out the messaging, news and calendar functions into their own windows outside of the main application interface, thus allowing a user to keep them open at the edge of one's screen while continuing to do other day-to-day work; adgiants functionality still just a click away. Increasing integration of Web technologies into OS's offers many other possibilities, such as integration into the actual user's desktop.

Branch Sub-Servers—Placement of servers into local branches brings many enhancements. Aside from the more obvious network gains through increased speed and proximity, a local server can provide other important benefits: digitization and archiving of office documents provides central access and management of assets; day-to-day work flows can be incorporated into the application (such as scheduling, tracking, and reporting on calls and other tasks); and sharing of contacts and appointments, project and team management.

Shared Data Websites—Any information and assets entered into the system could easily serve as the basis for a dynamic website, where any changes would be instantly reflected in both systems. For instance, indexing new products or modifying current product properties (price, description, etc.) within the adgiants application would result in the public website's catalog being updated also.

The following support tools are provided:

Help—The Help tool can grow in many exciting ways. Live, interactive chat can be introduced that route to either internal or external support specialists. Text, video, and voice can all be used to facilitate and easy and direct communications. Guided help with the interface displaying what you must do, either controlled by the support representative or a built in Wiseguy can help illustration important steps and concepts. Creative assistants can even help by collaborating with the user on layouts in real time. Finally, online classes and seminars can be hosted that allow speakers and instructors to broadcast to a large number of users at once.

Calendar—The Calendar's task and event scheduling and tracking can be further augmented with in-depth project and team management tools that aid in daily operations.

Community—The Community and Communication tools offer many opportunities for increased functionality. Many advanced instant messenger features can be incorporated into it such as file sharing (both with already archived assets and personal files on the users' systems), voice/video teleconferencing, shared whiteboard and template creation collaboration, net casting (broadcasting of voice/video events to a large audience), and even an email client (with import/export capabilities to Outlook and other popular email client software).

Directory—The Directory of contacts and businesses can be further bolstered by building on its basic structure to include a comprehensive personal address book that could be tied to external contact databases (customers, company, suppliers, etc.) as well as support importing/exporting of contact files.

Asset Management—The Lightbox (Asset Management Tool), though already very powerful on its own, will be improved by adding file versioning (the ability to store and track numerous versions of files, preventing users from overwriting each other's work and maintaining a history of changes), associated file merge functions (for combining changes in different versions of documents), file check-in/out (that would make checked-out files read only for other users until they were checked back in), batch processing of tasks (such as resizing images or outputting them in different formats) as well as batch uploading/downloading (uploading or downloading multiple files at once), highly automated archiving of assets (for instance, Microsoft Office documents amongst many others have extended file attributes that be used to auto-complete many of the fields necessary for indexing an asset into the system—i.e. author, date created, title, subject, etc.), and, finally, the increased ability to further compile/decompile numerous file types (such as PDF, EPS, PSD, XML, and others; any such file could be seamlessly edited within or outside of the application and yet be made immediately accessible via file upload/download to the other platform, local system or adgiants application).

The system includes the following productivity tools:

Template Tool—Current localization and simple editing features of the Template tool will be built on to offer more advanced features. Complete, powerful layout capabilities are possible that would allow most of the functionality of expensive page layout software such as Adobe PageMaker or Quark Xpress. Meanwhile, localization functions will be improved by allowing batch processing (scripting) of templates (i.e. you could select all of the stores that an ad was to be localized for and have the system output all of the modified final files). And of course, some of the features mentioned above such as template sharing/collaboration, and compiling/decompiling of various file types will be added.

Audio/Video Editing—Whereas currently any changes to audio or video templates (TV or radio ads) must be processed by a studio after ordering, it will be possible to use other software to allow automated editing and output of these files. This would be easiest in the case of video where the tag line is all that changes, but could also be feasible for other more advanced operations. This will end up saving huge amounts of money since post-production costs are very high.

Sub-Accounts—Sub-accounts for clients, contractors, and suppliers can facilitate access to reduced functionality tools such as the Lightbox, order fulfillment tools, or even some of the template tools. This could, for example, allow contractors to perform some tasks through the system while preventing them full access to the application.

Marketing Management Tools—Marketing plan and campaign tools could be added and bolstered. Defining of goals, budget, etc. and tracking of costs, progress, templates, orders, results, etc. will help in managing and planning marketing strategies. Reports will be generated that illustrate the effectiveness of ads and campaigns, chart spending vs. sales, and other powerful decision making documents.

Market Research Tools—Market research tools will help in planning and implementing market research as well as provide a library of past market research reports.

Figure 2:
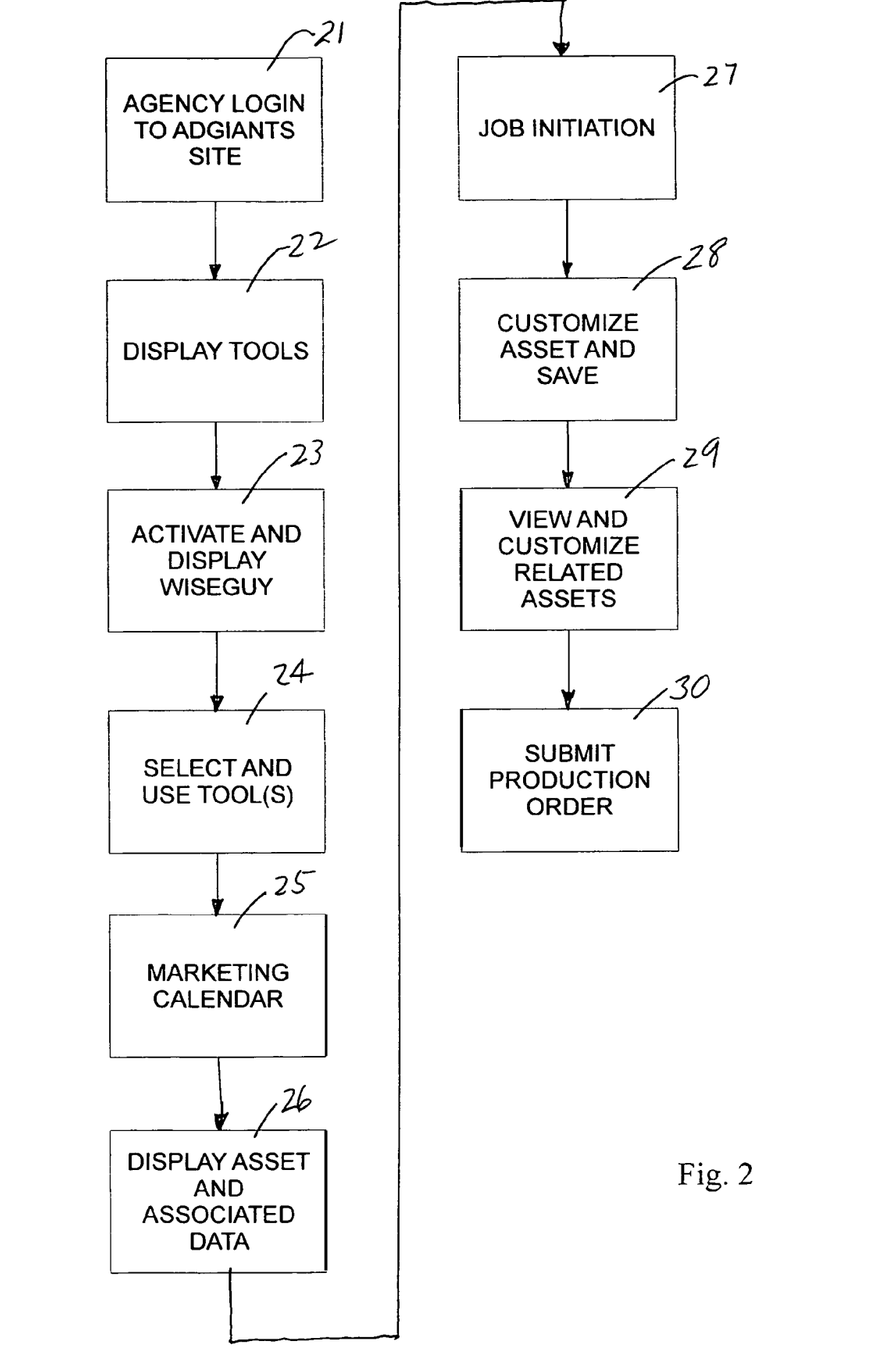
FIGS. 2 and 3 are flow diagrams of the method of using the system according to the present invention.

The system according to the present invention is accessed and used as described below with reference to FIG. 2. A website maintained by "adgiants" is operated on the server 10 (FIG. 1). In the following description, three levels of access are used in the example, but more or less than three could be used within the scope of the invention. The method according to the present invention begins with a login at "Login to Adgiants Site" 21 via one of three doorways. The three categories of users each associated with a separate doorway are: 1) the client (the entity that is advertising); 2) the agency (responsible for creating and placing the advertising); and 3) the owner/operator (affiliated with the client in the geographic area in which the advertising is run).

Once the user is identified, authorization and category, the website displays a set of tools at "Display Tools" 22 that are available to the category of user. Also, an animated and speaking "wiseguy" is provided at "Activate and Display Wiseguy" 23. The "wiseguy" can be, for example, a corporate spokesperson such as Ronald McDonald of McDonald's Corporation. The "wiseguy" speaks comments, instructions, helpful hints, questions, etc. and is interactive in response to the user inputs.

The user is now ready to use the displayed tools at "Select and Use Tools(s)" 24. For example, for an agency user a Marketing Calendar display 25 can be selected to permit viewing by national or regional, date and asset. The selected asset is then displayed at "Display Asset and Associated Data" 26 in the associated format. Details of the asset are available for viewing such as title, description, cost, start and end dates, etc.

The agency user can initiate a new job at "Job Initiation" 27 utilizing current assets. The selected asset can be customized in every aspect or component and saved at "Customize Asset and Save" 28. Next, related assets can be viewed and customized at "View and Customize Related Assets" 29. An example of related assets is a newspaper ad associated with a television ad that has been customized. The user then submits a production order at "Submit Production Order" 30 to finalize the changes.

Figure 3:
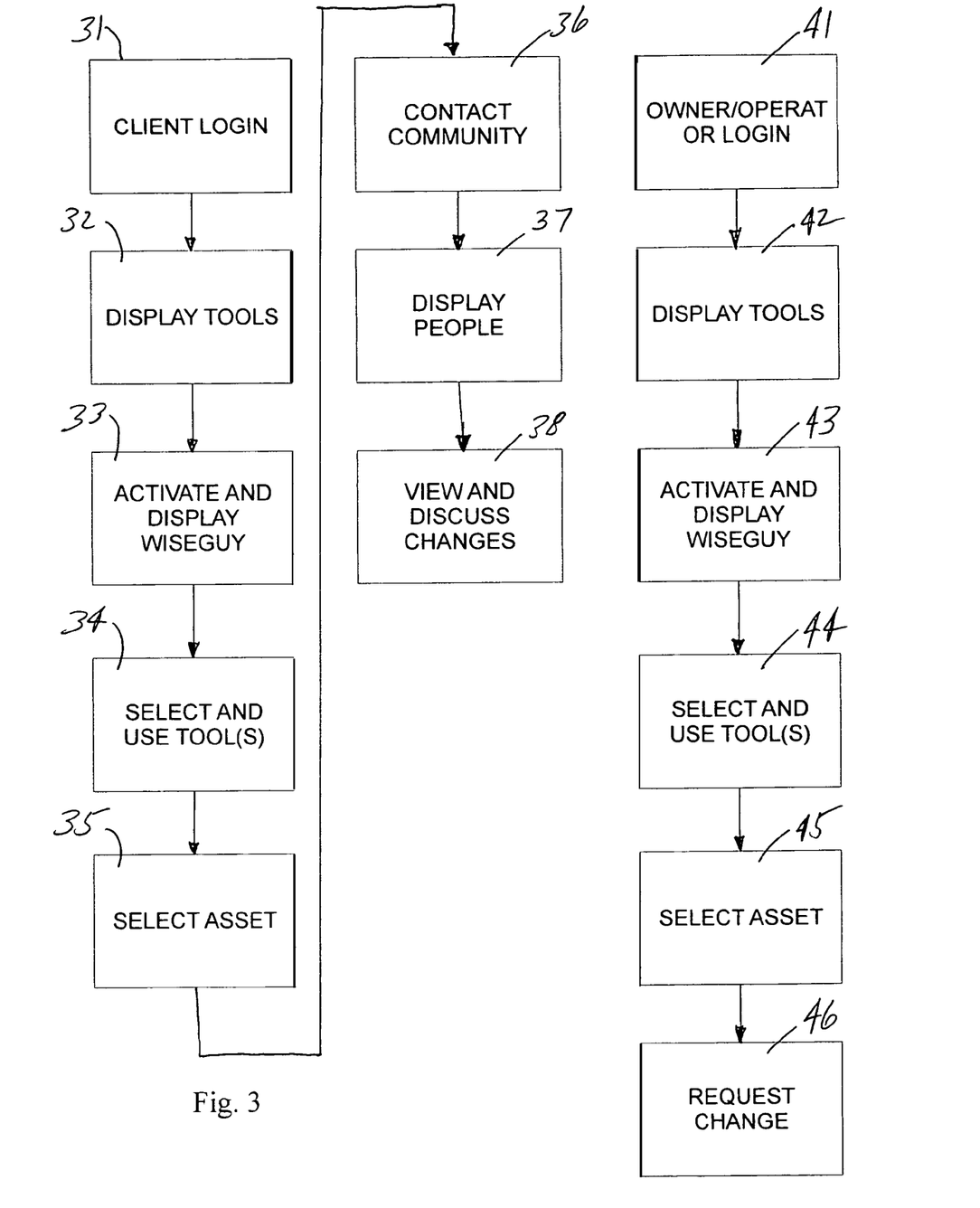

The client and owner/operator flow diagrams are shown in FIG. 3. Steps 31 through 34 for the client and steps 41 through 44 for the owner/operator are the same as the steps 21 through 24 shown in FIG. 2. The client then selects an asset at "Select Asset" 35 and contacts persons who will discuss changes to the asset at "Contact Community" 36. Those persons might include an account representative of the responsible advertising agency, a creative person who will make the changes and a media placement person. The persons in the community can observe each other via video feeds to and from different locations at "Display People" 37. The system and method according to the present invention permits the selected asset and proposed changes to be viewed and discussed via "View and Discuss Changes" 38.

The owner/operator can select an asset at "Select Asset" 45 for viewing. Then the owner/operator can request changes to the selected asset at "Request Change" 46.

Figure 4:
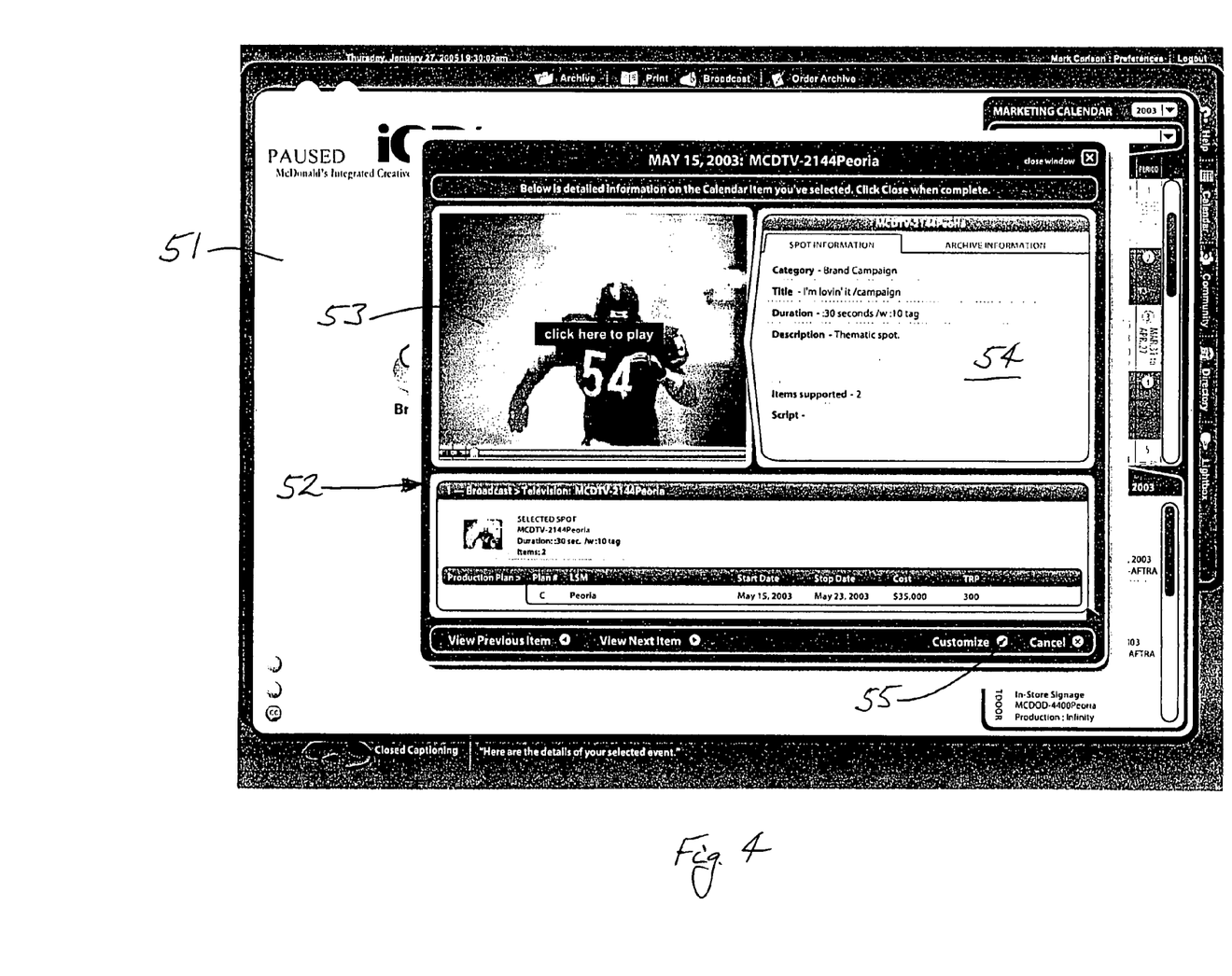
FIG. 4 is a screen display of a selected asset.

FIG. 4 is a screen display showing a typical computer monitor display 51 generated by the system according to the present invention. Superimposed on the display 51 is a widow 52 displaying a selected asset. In this example, a television spot is displayed in a video clip area 53 and an information area 54 displays information such as spot information (shown) or archive information. A "Customize" button 55 permits the user to change the content of the spot and publication data.

Figure 5:
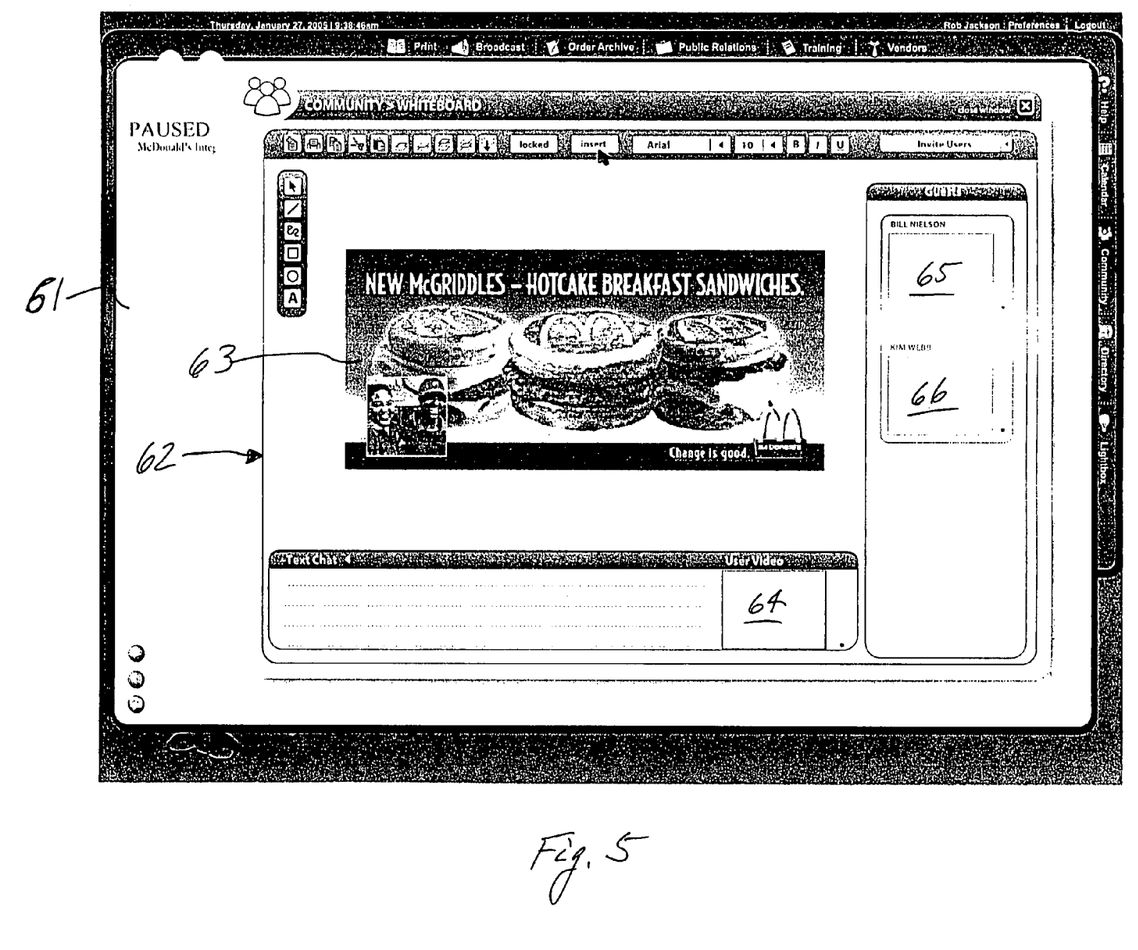
FIG. 5 is a screen display of a community conference regarding an asset.

FIG. 5 is a screen display showing a typical computer monitor display 61 generated by the system according to the present invention. Superimposed on the display 61 is a widow 62 displaying a selected asset 63. At the bottom of the window 62 is a user video display area 64 in which live video of the user is displayed. To the right in the window 63 are two guest video areas 65 and 66 in which live video of guests is displayed for video conferencing. The guests are selected by the user and appear in an expandable guest area 67 that accommodates more than the two guests 65 and 66 shown. The user 64 and the guests 65 and 66 can view the asset 63 and make changes to it.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for marketing management including dynamic advertisement creation and customization, comprising:

a database storing a plurality of advertisements, said advertisements being modifiable and including a television spot, a radio spot, a newspaper ad, or a billboard ad used to advertise a product or a service, each of the stored advertisements including a plurality of components for creating a display of the stored advertisement, said components including a page template, an audio template or a video template depending on the type of the advertisement;

an administrator server computer connected to said database, said server computer running a computer program permitting a login to the administrator server computer by an authorized user at a remote computer to access said database; and the remote computer being a user computer having a processor, the remote computer remotely connected to said server computer, the remote computer permitting an authorized user to login at said remote computer, the remote computer displaying tools for use by the authorized user, the remote computer activating and displaying a wiseguy at the remote computer for interaction with the authorized user, the wiseguy speaking instructions, helpful hints, and questions and being interactive in response to inputs by the authorized user, the authorized user selecting and using the tools at the remote computer to modify individual ones of the plurality of components of a selected one of the stored advertisements, said authorized user modifying the page template, the audio template or the video template depending on the type of advertisement, the display of the selected one of said stored advertisements changed when used to advertise the product or the service, and the authorized user creating a new advertisement, storing the new advertisement, displaying the selected one stored advertisement, and customizing the selected one stored advertisement.

2. The system according claim 1 wherein said server computer includes means for identifying said authorized user as belonging to a category of users permitted to perform at least one of create new advertisements, store said new advertisements in said database, and place said advertisements to be run.

3. The system according to claim 2 wherein said means for displaying assigns each said authorized user to at least one of ad agency, client, client branch, owner/operator and media categories.

4. The system according to claim 1, wherein said at least one remote computer is one of an ad agency computer, a client computer, a client branch computer and a media computer.

5. The system according claim 1 wherein said server computer provides video conferencing by at least two authorized users.

6. A method for marketing management including dynamic advertisement creation and customization, the method comprising the steps of:

a. providing a database and storing in the database a plurality of advertisements, said advertisements being modifiable and including a television spot, a radio spot, a newspaper ad, or a billboard ad used to advertise a product or a service, each of the stored advertisements including a plurality of components for creating a display of the stored advertisement, said components including a page template, an audio template, or a video template depending on the type of the advertisement;

b. providing an administrator server computer and connecting the administrator server computer to the database;

c. running a computer program on the server computer permitting an authorized user at a remote computer having a processor to access the database in response to a predetermined login by the authorized user, a wiseguy activated and displayed at the remote computer for interaction with the authorized user, the wiseguy speaking instructions, helpful hints, and questions and being interactive in response to inputs by the authorized user;

d. displaying one of the stored advertisements selected by the authorized user on the remote computer;

e. displaying tools at the remote computer for use by the authorized user;

f. permitting the authorized user to select and use the tools at the remote computer to modify individual ones of the plurality of components of the selected one stored advertisement, said authorized user modifying the page template, the audio template, or the video template, depending on the type of the advertisement, the display of the selected advertisements changed when used to advertise the product or the service; and g. creating a new advertisement, storing the new advertisement, displaying the selected one stored advertisement, and customizing the selected one stored advertisement.

7. The method of claim 6 including assigning the authorized user to one of a plurality of categories of users permitted to perform at least one of create new advertisements, store the new advertisements in the database, and place the stored advertisements to be run.

8. The method according to claim 7, including assigning the authorized user to at least one of ad agency, client, client branch, owner/operator and media categories.

9. The method according to claim 6 wherein the tools include a template tool for performing said step f.

10. The method according to claim 6 wherein the tools include an audio/video editing tool for performing said step f.

11. The method according to claim 6 wherein the tools include a marketing management tool for managing and planning market strategies.

\* \* \* \* \*